(12) United States Patent
Jones et al.

(10) Patent No.: US 6,209,676 B1
(45) Date of Patent: Apr. 3, 2001

(54) DIFFERENTIAL MOUNTING ASSEMBLY

(76) Inventors: Robert Allen Jones, 6763 Devonshire Cir., Canton, MI (US) 48128; Paul Owen Davis, 336 Riverlane, Dearborn, MI (US) 48124

( * ) Notice: Subject to any disclaimer, the term of this patent is extended or adjusted under 35 U.S.C. 154(b) by 0 days.

(21) Appl. No.: 09/382,259

(22) Filed: Aug. 24, 1999

(51) Int. Cl.$^7$ .................................................. B60K 17/16
(52) U.S. Cl. ......................... 180/354; 180/360; 180/378
(58) Field of Search ................................... 180/353, 354, 180/359, 360, 378

(56) References Cited

U.S. PATENT DOCUMENTS

| | | | |
|---|---|---|---|
| 2,112,628 | 3/1938 | Lee ........................................ | 180/354 |
| 3,379,268 | 4/1968 | Enke ...................................... | 180/360 |
| 3,952,824 | 4/1976 | Matschinsky ......................... | 180/353 |
| 4,699,230 | 10/1987 | Solleder et al. ...................... | 180/360 |
| 5,042,837 | 8/1991 | Kleinschmit et al. ................ | 180/360 |

FOREIGN PATENT DOCUMENTS

| | | | |
|---|---|---|---|
| 123650 | 7/1931 | (DE) ..................................... | 180/354 |

OTHER PUBLICATIONS

Chilton Book Company Repair and Tune–up Guide, Corvette 1984 to 1986, Copyright 1986, pp. 149–152, Chapter 7, Suspension and Steering, Published in Radnor, Pennsylvania by Chilton Book Company.

Mazda RX–7 Service Manual, 1993, Mazda Corporation, Japan.

Mercedes–Benz AG–Electronics Parts Catalogue (EPC), Rear Axle/Rear Subframe, Mercedes–Benz of North America, Inc., 1993.

Mercedes–Benz AG–Electronics Parts Catalogue (EPC), Rear Axle/Axle Shaft, Mercedes–Benz of North America, Inc., 1993.

Mercedes Benz AG–Electronics Parts Catalogue (EPC), Rear Axle/Rear Axle Housing with Differential, Mercedes–Benz of North America, Inc., 1993.

Mercedes Benz AG–Electronics Parts Catalogue (EPC), Propeller Shaft/Propeller Shaft, Mercedes–Benz of North America, Inc., 1993.

Mercedes Benz AG–Electronics Parts Catalogue (EPC), Rear Axle/Axle Shaft and Rear Wheel Brake, Mercedes–Benz of North America, Inc., 1993.

Mercedes Benz AG–Electronics Parts Catalogue (EPC), Front Axle/Axle Housing, Front, Mercedes–Benz of North America, Inc., 1993.

Mercedes Benz AG–Electronics Parts Catalogue (EPC), Front Axle/Axle Shaft and Front Wheel Brake, Mercedes–Benz of North America, Inc., 1993.

Mercedes Benz AG–Electronics Parts Catalogue (EPC), Front Axle/Transverse Control Arm, Torosion Bar and Front Subframe, Mercedes–Benz of North America, Inc., 1993.

Mercedes Benz AG–Electronics Parts Catalogue (EPC), Rear Axle/Axle Housing, Rear, Mercedes–Benz of North America, Inc., 1993.

Picture of Differential Mounting Assembly for use within Mercedes S Class Vehicle as Found in Literature Which was Published Before 1997.

Picture of Differential Mounting Assembly for use within Mazda RX–7 Vehicle as Found in Literature Which was Published in 1993.

*Primary Examiner*—Kenneth R. Rice
(74) *Attorney, Agent, or Firm*—Ford Global Technologies, Inc.

(57) ABSTRACT

A differential mounting assembly 10 which allows a differential 12 to be selectively and securely mounted within a vehicle and which substantially reduces and/or eliminates undesirable roll and pitch of the operatively mounted differential 12.

20 Claims, 3 Drawing Sheets

DIFFERENTIAL MOUNTING ASSEMBLY

FIELD OF THE INVENTION

This invention relates to a mounting assembly and more particularly to a differential mounting assembly which selectively and securely mounts a differential within a vehicle.

BACKGROUND OF THE INVENTION

A differential is normally mounted within a vehicle and receives the selectively rotating and torque producing vehicle driveshaft. The differential typically couples at least a portion of the received driveshaft torque to at least one wheel, effective to rotate the at least one wheel and allow the vehicle to be selectively and desirably driven.

Particularly, the driveshaft is normally caused to rotate along a first direction by the vehicle transmission, thereby producing a torque along this first direction and, more particularly, about an axis corresponding to the longitudinal axis of symmetry of the driveshaft. The differential typically receives a pair of axles, at least one of which is to be selectively driven. The differential couples and/or communicates the received driveshaft torque to the at least one driven axle along a direction which is different (e.g., perpendicular) from the direction of the driveshaft-produced torque, thereby allowing the wheels, which are mounted upon the pair of axles, to selectively turn or rotate. The differential may be selectively and operatively placed within the "front" of the vehicle (e.g. below the engine compartment) in "front wheel" or "all wheel" drive type vehicles, or in the "rear" of the vehicle in "rear wheel" drive type vehicles.

It is desirable to securely mount the differential within the vehicle and, more particularly, to minimize and/or to substantially eliminate differential "roll" (e.g. rotation about a longitudinal axis passing through the differential). Roll type movement causes the received axles to undesirably move or "flex" with respect to the differential, thereby creating noise and vibrations which are undesirably communicated into the vehicle passenger compartment, causing the differential and axle assemblies to fail or to potentially disengage, and reducing the operating life of the differential and axle assemblies. Similarly, "pitch" type movement (e.g. upward and/or downward movement of the differential) is also undesirable and causes undesirable articulation of the received driveshaft. Such articulation also produces noise and vibration and reduces the operating life of the driveshaft and differential assemblies. Current differential mounting assemblies and methods do not substantially prevent or eliminate differential roll and pitch and do not substantially eliminate the previously delineated and undesirable consequences of such differential roll and pitch movement.

There is therefore a need to provide a method and an apparatus which allows a differential to be selectively and securely mounted within a vehicle in a manner which substantially eliminates or reduces the amount of roll and/or pitch of the differential and which concomitantly reduces at least some of the previously delineated and undesirable effects and/or consequences emanating from the undesired roll and/or pitch of the differential.

SUMMARY OF THE INVENTION

It is a first object of the invention to provide a method and an apparatus which overcomes at least some of the previously delineated drawbacks of prior differential mounting methods and apparatuses.

It is a second object of the invention to provide a method and an apparatus which allows a differential to be selectively and securely mounted within a vehicle and which substantially eliminates and/or reduces roll and/or pitch type movement or motion of the mounted differential.

It is a third object of the invention to provide a method and an apparatus which allows a differential to be selectively and securely mounted within a vehicle and which substantially reduces the amount of angular displacement or flex of the axles and/or the amount of undesired articulation of the received driveshaft.

It is a fourth object of the invention to provide a method and an apparatus which allows a differential to be selectively and securely mounted within a vehicle and which substantially eliminates and/or reduces the amount of vibration or noise which is generated by and/or which results from the operatively mounted differential.

According to a first aspect of the present invention a mounting assembly is provided for use with a differential which is to be operatively deployed within a vehicle. The vehicle is of the type which includes a selectively rotating and torque producing driveshaft. The differential receives the torque produced by the driveshaft and outputs at least some of said received torque.

The mounting assembly includes a first member which selectively attaches the differential to the vehicle; a second member which selectively attaches the differential to the vehicle; and a third member which is selectively attached to the differential and which includes a fourth member which is selectively attached to the vehicle at a location which is remote from the differential.

According to a second aspect of the invention, a method is provided to selectively mount a differential within a vehicle. The differential being of the type which movably receives at least one axle, which receives torque from a driveshaft, and which provides at least a portion of the received torque to the movably received at least one axle, the received and the provided torques cooperatively forming a torque vector having a certain direction.

The method includes the steps of attaching the differential to a position within the vehicle which resides upon an axis which is perpendicular to the certain direction of the torque vector and which is distant from the differential; and attaching the differential to the vehicle along an axis which is parallel to the at least one axle, thereby securely mounting the differential within the vehicle.

These and other aspects, features, and embodiments of the present invention will become apparent from a review of the following specification and by reference to the following drawings.

DETAILED DESCRIPTION OF THE PREFERRED EMBODIMENT

Figure 1:
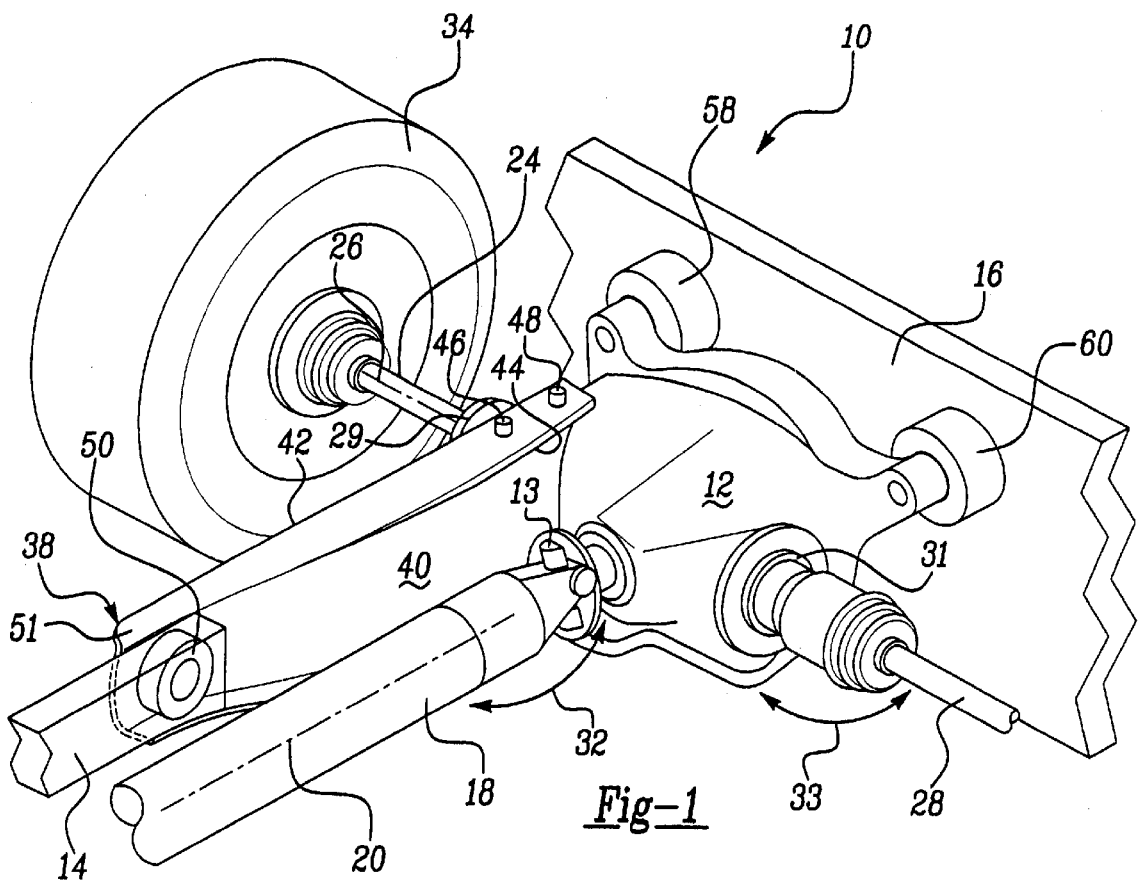
FIG. 1 is a perspective view of a differential mounting assembly which is made in accordance with the teachings of the preferred embodiment of the invention and which is shown selectively and operatively mounting a conventional differential within a vehicle.
Figure 2:
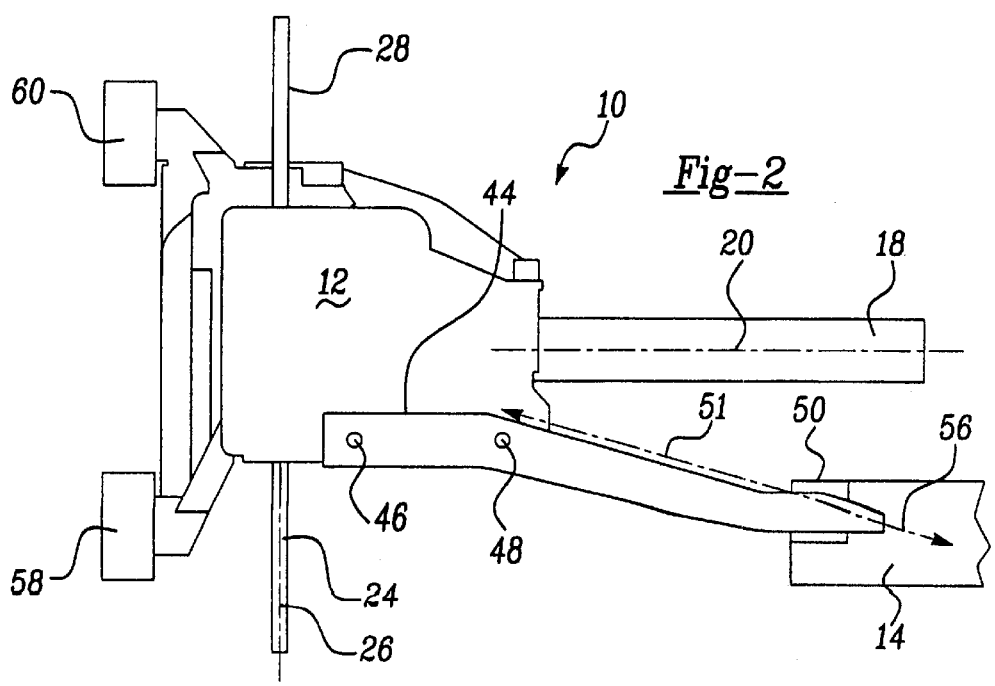
FIG. 2 is a top view of the differential mounting assembly which is shown in FIG. 1.
Figure 3:
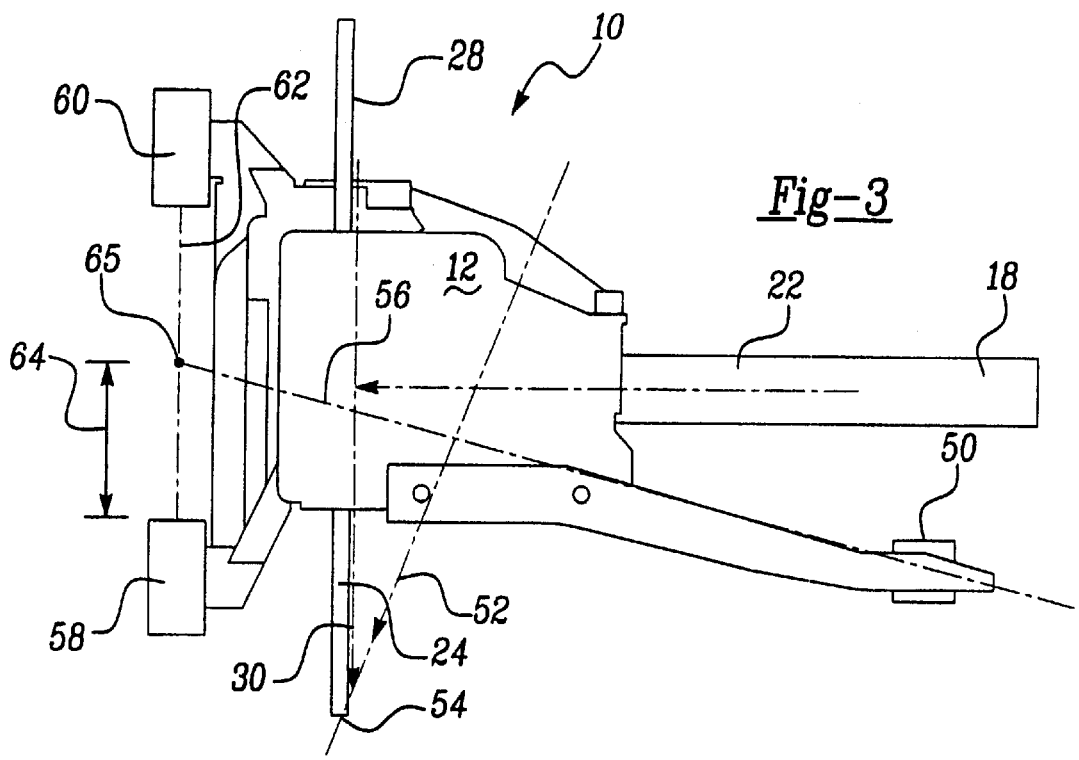
FIG. 3 is a vector diagram which is superimposed upon the mounting assembly and the differential which are shown in FIG. 2.

Referring now to FIGS. 1, 2, and 3 there is shown a differential mounting assembly 10 which is made in accordance with the teachings of the preferred embodiment of the invention and which selectively and securely mounts a typical and conventional differential 12 within a typical and conventional vehicle, and more particularly to vehicle structural or frame members 14, 16.

Particularly, differential 12 is attached to a conventional "U" joint 13 which allows the differential 12 to receive a selectively rotatable driveshaft 18 having a longitudinal axis of symmetry 20 about which a torque is produced. Drive shaft 18 therefore selectively creates a torque and this created torque may be mathematically represented by a torque vector 22 having a certain magnitude and a certain direction which is substantially aligned with the axis 20 of the driveshaft 18.

In operation, the driveshaft-provided torque is selectively communicated to the differential 12 and the differential 12 selectively provides, outputs, and/or communicates at least some of the received torque to at least one movably received axle 24, about an axis 26, substantially corresponding to the longitudinal axis of symmetry of the axle 24. In this non-limiting embodiment, the single axle 24 is "driven" or rotated. In another non-limiting embodiment, the differential "drives" or rotates each of the movably received axles 24, 28. The differential-output torque therefore creates and/or may be mathematically represented by a certain torque vector 30 having a certain magnitude and a certain direction which is substantially aligned along the axis 26 and which is substantially perpendicular to the driveshaft axis 20.

As further shown, the received driveshaft 18 forms an angle 32 with respect to differential 12. Moreover, each axle 24, 28 is received by a respective constant velocity joint 29, 31, which is contained within the differential 12, and forms a certain respective "drive line angle" 33 with respect to differential 12. Axles 24, 28 are also selectively and respectively attached to a wheel, such as wheel 34, which is selectively rotated by the respective axles 24, 28, effective to allow the vehicle to be selectively moved or be driven. It is highly desirable to have these angles 32, 33 remain relatively constant and about equal to one hundred eighty degrees (180°). In this manner, the axles 24, 28 and the driveshaft 18 substantially and perpendicularly extend from the differential 12 during operation and allow for a relatively smooth ride and for optimal wear of the articulating joints 13, 29, 31, differential 12 and axles 24,28.

Roll of the differential 12 (e.g. a "turning" or rotation of the differential 12 about the driveshaft axis 18) or a pitch of the differential 12 (e.g. a "turning" or rotation of the differential about the axis 26), causes the received axles 24, 28 and driveshaft 18 to undesirably articulate. Particularly, the undesired articulation of driveshaft 18 and axles 24, 28 alters angles 32, 33, creates noise and vibrations which are communicated into the passenger compartment, and decreases the operational life of the axle and differential assemblies. Differential mounting assembly 10 addresses these difficulties.

As shown best in FIGS. 1–3, the differential mounting assembly 10 of the preferred embodiment of the invention includes a member or a beam 38 which, in one non-limiting embodiment, substantially comprises an "I"-beam. Other shapes, "styles", or types of beams may be used within mounting assembly 10. For example and without limitation, as shown best in FIG. 4, beam 38 could be substantially tubular in shape and generally hollow or solid. In this alternate embodiment, tubular beam 38 is attached to differential 12 by bolts or conventional fasteners 39.

Particularly, in this non-limiting embodiment, beam 38 includes substantially identical and opposed generally "C"-shaped channels 40, 42 which are each substantially and longitudinally coextensive with beam 38. A first portion 44 of channel 40 generally conforms to the shape of the differential 12 and frictionally and selectively receives the differential 12. As shown, channel portion 44 is coupled to the received portion of differential 12 by the use of conventional and commercially available securing members 46, 48, such as bolts. Beam 38 (e.g. opposed channels 40,42) angularly and taperingly extend from the received differential 12 allowing the differential to be mounted upon and or within a vehicle at a location which is relatively far removed, distant, and/or remote from the "U"-joint 13, from the member 16, and from the differential 12. This "remote" or "distant" mounting has many desirable benefits which are more fully delineated below. The tapered end 51 of beam 38 therefore contains a movable mounting member, such as a conventional bushing 50, which selectively allows the extended and tapered end 51 of the beam 38 to be attached to a vehicle structural support or frame member 14 which is "remote" and/or "distant" from member 16, from "U"-joint 13, and from differential 12. It should be appreciated that beam end 51 may be selectively configured to conform and adapt to the various geometric and mounting constraints emanating from the various contained vehicle assemblies, such as the engine and the related engine components. Hence, end 51 may be selectively bent in the manner shown or be selectively shaped in a different manner in order to adapt to these various vehicle-mounting constraints.

As shown best in FIG. 3, torque vectors 22 and 30 may be mathematically summed and therefore cooperatively form a net-torque vector 52 having a certain magnitude and a certain direction which is substantially aligned along an axis or direction 54. In this non-limiting embodiment, substantially any axis which traverses differential 12 and which is substantially perpendicular to axis 54 is represented and/or may be utilized as a substantial "zero roll" axis. One non-limiting example of such a "zero roll" axis is axis 56, shown best in FIG. 3 and upon which the extended portion 51 of beam 38 and the movable member 50 reside. Properly securing differential 12 to the vehicle (e.g. to remotely or distantly positioned member 14 along a "zero roll" axis 56) substantially reduces or eliminates "roll" and "pitch" type movement of differential 12. This arrangement is further shown and delineated below.

As shown, assembly 10 further includes two substantially identical movable mounting members 58, 60 which, in the preferred embodiment of the invention, cooperatively define and selectively reside upon an axis 62 which traverses each of the movable mounting members 58,60. In this non-limiting embodiment, each of the movable mounting members 58,60 are attached to differential 12 and to vehicle member 16 along this axis 62 which is substantially parallel to the axis 26 and to the direction of vector 30. Further, axis 62 is substantially perpendicular to the direction of vector 22 and to axis 20. Axis 62 further intersects axis 56 and cooperates with axis 56 to form a point of intersection 65. Each movable mounting member 58, 60 is further positioned at a substantially equal distance 64 from the point of intersection 65, thereby causing and/or defining axis 56 to be the "zero roll" axis.

As is further shown, movable mounting members 56, 58 are remotely located from movable mounting member 50 and cooperate with movable mounting member 50 to substantially prevent and/or to substantially eliminate "roll type" or "pitch type" movement of the differential 12. Moreover, in one embodiment of the invention, each of the movable mounting members 58, 60 are substantially identical and each of these movable mounting members 58,60 are substantially identical to the movable mounting member 50. The use of substantially identical movable mounting members 50, 58, and 60 simplifies the overall differential mounting design and the production of assembly 10 and reduces overall production and manufacturing costs.

Applicant has further found that by remotely or distantly positioning movable mounting member 50 from movable mounting members 58, 60, from "U"-joint 13, and/or from differential 12 the amount of differential "pitch" is substantially eliminated or substantially reduced.

That is, the "pitch" type differential movement is typically imparted upon differential 12 from the beam 38 and/or from the channel 40. The selective and extended or distant/remote placement of movable mounting member 50 from movable mounting members 58,60, from differential 12, and from "U"-joint 13, reduces and/or substantially eliminates the movement of the differential 12 about the axis 26 by reducing the amount of "pitch" type force which is applied to the differential 12 and to the movable mounting members 50, 58, 60.

Further, by placing members 58, 60 along axis 62 and at substantially equal distances 64 from the intersection point 65 of axes 56 and 62, differential "pitch" is further reduced and/or eliminated and "roll" is substantially reduced and/or eliminated. Hence, the cooperative use of movable mounting members 50,58, and 60 substantially ensures that the movement of beam 38 will not substantially and undesirably impact or appreciably alter or change the angels 32,33. These angles 32,33 are therefore "kept" relatively constant as the vehicle is driven and operated, noise and vibrations which are typically caused by the undesired movement of the differential 12 are substantially eliminated, and the "operating life" of the differential 12, axles 24,28, "U"-joint 13, and constant velocity joints 29,31 is improved. The overall "ride" of the vehicle is also improved.

In one non-limiting embodiment of the invention, to achieve the foregoing benefits, movable mounting member or bushing 50 remotely extends from and is selectively and remotely positioned upon member 14 at a location which is separated from differential 12 by a distance of about 150 millimeters ("mm") to about 400 mm. Other distances, including but not limited to those distances which are longer than 400 mm may selectively be utilized. The distance or separation between movable mounting members 58, 60 is also, in this non-limiting embodiment, about 150 mm to about 500 mm, although other distances may be selectively utilized.

As should now be apparent, it is also highly desirable to widely separate movable mounting members 58, 60 by a relatively large distance in order to minimize the forces which are applied to these movable mounting members 58, 60 and to substantially prevent these movable mounting members 58, 60 from undesirably transmitting vibrations to other portions of the vehicle, while concomitantly "keeping" angle 33 relatively constant. In one non-limiting embodiment, the distance between movable mounting members 58, 60 is about one-half of the distance or the length of the portion of the beam 38 which extends from the differential 12. Other distances or separation lengths may be selectively utilized. It is also highly desirable to separate movable mounting member 50 from movable mounting members 58, 60 by a respective linear distance of about 400 mm to about 1000 mm, although other distances may be utilized. These relatively low "applied" forces allow for the use of commercially available "soft" bushings having a relatively low "stiffness rating" which do not readily cause articulation of driveshaft 18 and axles 24, 28 upon receipt of a force, thereby further ensuring the substantial reduction and/or elimination of differential "roll" and "pitch" movement. These "soft bushings" in combination with the previously described mounting assembly substantially prevent roll and pitch of the differential 12 and articulation of the various joints 13, 29, 31.

Figure 5:
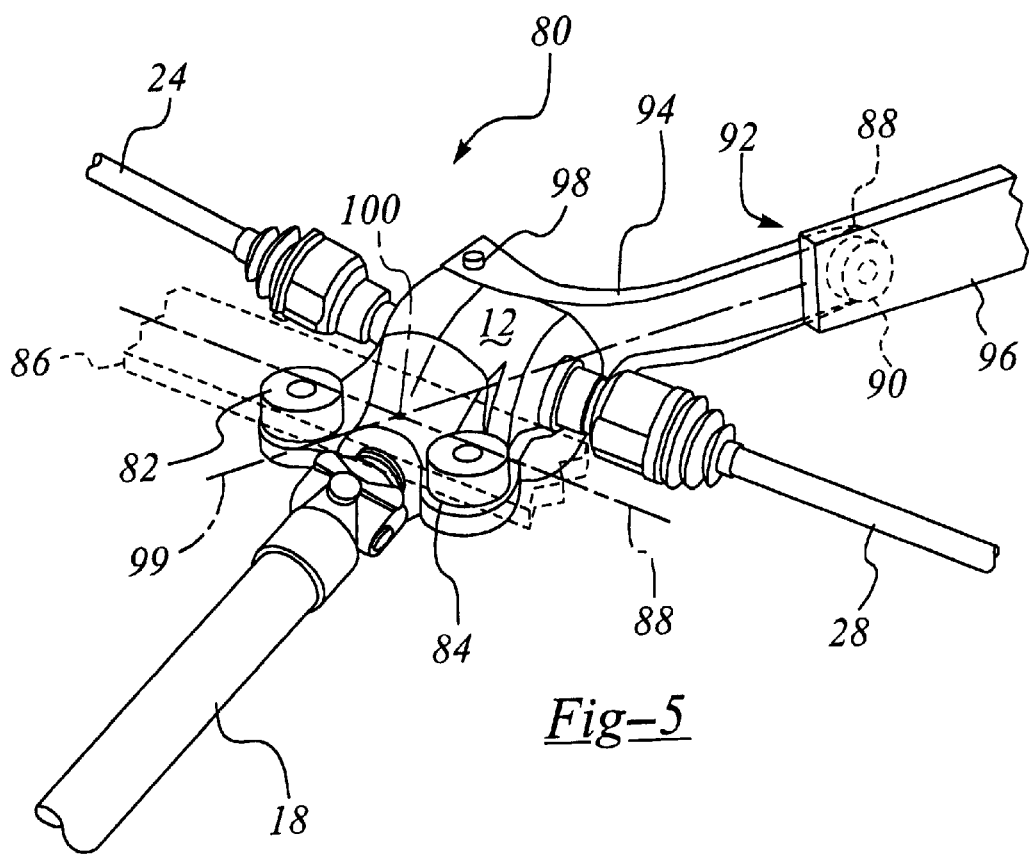
FIG. 5 is a top perspective view of a differential mounting assembly which is made in accordance with the teachings of yet another alternate embodiment of the invention.

Referring now to FIG. 5 there is shown a differential mounting assembly 80 which is made in accordance with the teachings of yet another alternate embodiment of the invention and which is adapted for u with differential 12. As shown and as previously discussed, differential 12 movably receives a driveshaft 18 and a pair of axles 24, 28. In this non-limiting embodiment, bushings 82, 84, which are respectively and substantially identical to bushings 58, 60 attach differential 12 to a vehicle frame member 86 which has a longitudinal axis of symmetry 88 which is parallel to axis 24, 28 and which is further positioned in relative close proximity to driveshaft 18 and upon the same end portion of the differential 12 which receives driveshaft 18.

Bushing 90, which is substantially identical to bushing 50, is remotely positioned from the differential 12 and attaches a first end portion 92 of beam 94 to a vehicle member 96. In one non-limiting embodiment, members 96 and 14 are substantially similar. Further, as shown, beam 94 is attached at an end portion of differential 12 opposite the end portion which receives driveshaft 18. Particularly, beam 94 is attached to the differential 12 by use of conventional fasteners 98.

Figure 4:
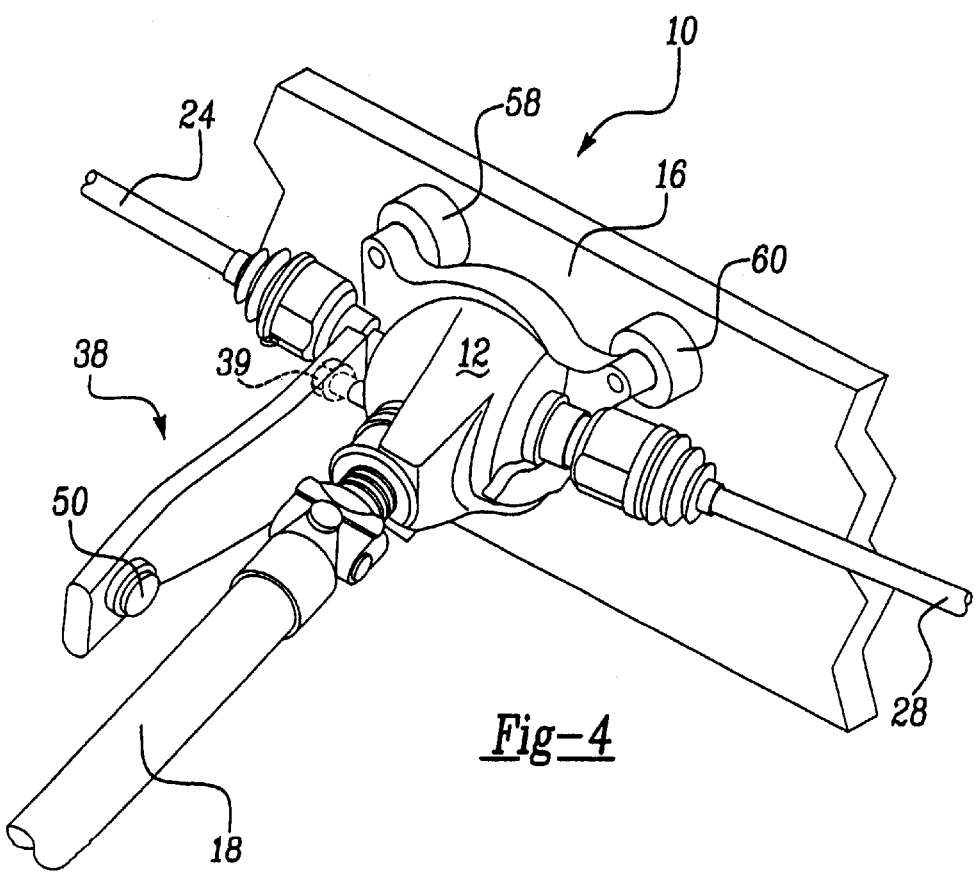
FIG. 4 is a view similar to that of FIG. 1 but illustrating a differential mounting assembly which is made in accordance with the teachings of an alternate embodiment of the invention.

Beam 94 is substantially identical to a selected one of the beams 38 which are respectively shown in FIGS. 1 and 4 and has a longitudinal axis of symmetry 99 which lies along and/or comprises a zero roll axis. Particularly, axis 99 intersects the axis 88 upon which bushings 82, 84 reside and cooperatively forms a point 100 of intersection. In this embodiment, bushings 82, 84 are equidistantly positioned upon axis 98 from point 100. This configuration provides substantially the same benefits as the configuration shown in FIGS. 1–4 and which have been previously described.

It is to be understood that the invention is not limited to the exact method and apparatus which has been delineated and described above. Rather, various changes and modifications may be made without departing from the spirit or the scope of the inventions. Particularly and without limiting the generality of the foregoing, it should be appreciated that while one geometric axial and vector configuration has been presented in the foregoing specification, this invention should not and is not intended to be limited by this previously presented configuration. Rather, this configuration was presented for the purpose of allowing for a broad understanding of the invention. As should now be apparent, the various aspects of this invention may be selectively applied to a differential mounting assembly having a "zero roll" axis which has a direction different from axis 56, and to different types of frame or support members other than those vehicle mounting members 14, 16 which have been previously discussed.

What is claimed is:

1. A mounting assembly for use in combination with a differential of the type which is used within a vehicle having a frame and a selectively rotating and torque producing driveshaft, said differential receiving said torque and outputting at least some of said received torque, said mounting assembly comprising:

a first member which selectively attaches said differential to a first portion of said frame;

a second member which selectively attaches said differential to a second portion of said frame; and a third member which extends along a zero-roll axis and which is selectively attached to said differential and which includes a fourth member is selectively attached to a third portion of said frame remote from said differential.

2. The mounting assembly of claim 1 wherein said fourth member resides upon a first axis and wherein said first and said second members reside upon a second axis which intersects said first axis and which cooperates with said first axis to form a point of intersection, each of said first and said second members being positioned upon said second axis at a certain and substantially equal distance from said point of intersection.

3. The mounting assembly of claim 1 wherein said first, second, and fourth members movably couple said differential to said first, second and third portions of said frame.

4. The mounting assembly of claim 3 wherein said differential has a first portion which receives said driveshaft and wherein said first and said second members are attached to first portion of said differential.

5. The mounting assembly of claim 2 wherein said fourth member is separated from said differential by a distance which is longer than said certain distance.

6. The mounting assembly of claim 5 wherein said certain distance equals about 200 millimeters.

7. The mounting assembly of claim 5 wherein said differential has a portion which receives said torque and wherein said third member extends in a direction parallel to said driveshaft and past said portion of said differential which receives said torque.

8. The mounting assembly of claim 1 wherein said third member is tubular.

9. The mounting assembly of claim 1 wherein said third member is substantially "c"-shaped to generally conform to said differential.

10. A mounting assembly for use with a differential of the type which is selectively mounted within a vehicle having a frame, which receives a certain torque, and which provides at least a portion of said received certain torque, said received and said provided torques each forming a respective torque vector having a respective magnitude and direction and cooperatively forming a net torque vector which is selectively created by summing said respective torque vectors and which extends along a certain torque axis, said mounting assembly comprising:

a beam having a first portion which generally conforms to and is selectively attached to said differential and having a second portion which extends outward from said differential along a zero-roll axis and which includes a first movable member which is selectively attached to a portion of said frame which is distant from said differential;

a second movable member which is selectively attached to said differential along a second axis which intersects said certain torque axis, which is parallel to said direction of said provided torque vector, and which is perpendicular to said direction of said received torque vector; and a third movable member which is selectively attached to said differential along said second axis and which cooperates with said first and said second movable members to securely and selectively mount said differential within said vehicle.

11. The mounting assembly of claim 10 wherein said second and said third movable members comprise bushings.

12. The mounting assembly of claim 11 wherein said bushings are substantially identical.

13. The mounting assembly of claim 10 wherein said certain torque axis and said second axis cooperatively form a point of intersection, said second and third movable members each selectively positioned upon said second axis at a respective and substantially equal distance from said point of intersection.

14. The mounting assembly of claim 13 wherein said substantially equal distance is equal to a distance of about 150 millimeters to about 500 millimeters.

15. The mounting assembly of claim 14 wherein said first movable member is separated from said second movable member by a distance of about 400 millimeters to about 1000 millimeters.

16. A method of securely mounting a differential within a vehicle having a frame, said vehicle being of the type which has a selectively rotatable driveshaft which produces a torque, said differential being of the type which receives said torque which is produced by said driveshaft, which receives at least one axle, and which provides at least some of said received torque to said at least one axle, said method comprising the steps of:

defining a zero-roll axis;

coupling said differential to a first portion of said frame which is remotely located from said differential and which resides along said zero-roll axis; and coupling said differential to a second portion of said frame along a second axis which intersects said zero-roll axis.

17. The method of claim 16 wherein said step of coupling said differential to said first portion of said frame along said zero-roll axis comprises the steps of:

providing a bushing;

providing a beam;

coupling said beam to said differential; and coupling said beam to said first portion of said frame by use of said provided bushing.

18. The method of claim 16 wherein second axis is parallel to said at least one axle and wherein said step of coupling said differential to said second portion of said frame along said second axis comprises the steps of:

providing at least two bushings; and coupling said provided at least two bushings to said second portion of said frame and to said differential along said second axis.

19. The method of claim 18 wherein said second axis and said zero-roll axis cooperatively form a point of intersection and wherein said at least two bushings are equidistantly positioned upon said second axis from said point of intersection.

20. The method of claim 19 wherein each of said at least two bushings reside a distance of about 150 millimeters to about 500 millimeters from said point of intersection.

* * * * *